United States Patent
Kim et al.

(10) Patent No.: US 9,665,354 B2
(45) Date of Patent: May 30, 2017

(54) APPARATUS AND METHOD FOR TRANSLATING MULTITHREAD PROGRAM CODE

(71) Applicant: Samsung Electronics Co., Ltd., Suwon-si (KR)

(72) Inventors: Seong-Gun Kim, Yongin-si (KR); Dong-Hoon Yoo, Seongnam-si (KR); Jin-Seok Lee, Seoul (KR); Seok-Joong Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 124 days.

(21) Appl. No.: 14/268,383

(22) Filed: May 2, 2014

(65) Prior Publication Data

US 2014/0331216 A1    Nov. 6, 2014

(30) Foreign Application Priority Data

May 3, 2013    (KR) .......................... 10-2013-0050251

(51) Int. Cl.
*G06F 9/45* (2006.01)

(52) U.S. Cl.
CPC ............... *G06F 8/41* (2013.01); *G06F 8/433* (2013.01); *G06F 8/443* (2013.01); *G06F 8/452* (2013.01); *G06F 8/456* (2013.01); *G06F 8/458* (2013.01)

(58) Field of Classification Search
CPC .................. G06F 8/30–8/54; G06F 8/41–8/49
See application file for complete search history.

(56) References Cited

U.S. PATENT DOCUMENTS

| 6,820,250 | B2 | 11/2004 | Muthukumar et al. | |
| 7,386,864 | B2* | 6/2008 | Richardson | G06F 9/526 717/116 |
| 7,979,844 | B2* | 7/2011 | Srinivasan | G06F 8/314 717/149 |
| 8,561,046 | B2* | 10/2013 | Song | G06F 8/456 717/161 |

(Continued)

FOREIGN PATENT DOCUMENTS

| KR | 10-2009-0107972 A | 10/2009 |
| KR | 10-2012-0041581 A | 5/2012 |

OTHER PUBLICATIONS

Raman, Easwaran et al., "Structure Layout Optimization for Multithreaded Programs", 2007, pp. 1-12.*

(Continued)

*Primary Examiner* — Thuy Dao
*Assistant Examiner* — Christopher Franco
(74) *Attorney, Agent, or Firm* — Sughrue Mion, PLLC

(57) ABSTRACT

A method and apparatus for translating a multithread program code are provided. The method includes: dividing a multithread program code into a plurality of statements according to a synchronization point; generating at least one loop group by combining one or more adjacent statements based on a number of instructions included in the plurality of statements; expanding or renaming variables in each of the plurality of statements so that each statement included in the at least one loop group is executed with respect to a work item of a different work group; and enclosing each of the generated at least one loop group respectively with a work item coalescing loop.

24 Claims, 11 Drawing Sheets

(56) References Cited

U.S. PATENT DOCUMENTS

| | | | | |
|---|---|---|---|---|
| 8,584,103 B2* | 11/2013 | Bondhugula | ........... | G06F 8/443 717/106 |
| 8,726,251 B2* | 5/2014 | Kalogeropulos | ....... | G06F 8/452 717/160 |
| 9,081,928 B2* | 7/2015 | Van Eijndhoven | ..... | G06F 8/433 |
| 2005/0039167 A1* | 2/2005 | Fernandes | ............. | G06F 8/4441 717/116 |
| 2005/0050529 A1* | 3/2005 | Vrancic | .................... | G06F 8/34 717/150 |
| 2008/0294882 A1* | 11/2008 | Jayapala | ................. | G06F 9/325 712/241 |
| 2009/0259828 A1 | 10/2009 | Grover et al. | | |
| 2009/0259829 A1 | 10/2009 | Grover et al. | | |
| 2009/0259832 A1 | 10/2009 | Grover et al. | | |
| 2009/0259996 A1 | 10/2009 | Grover et al. | | |
| 2009/0259997 A1 | 10/2009 | Grover et al. | | |
| 2009/0307660 A1* | 12/2009 | Srinivasan | .............. | G06F 8/314 717/114 |
| 2011/0067014 A1* | 3/2011 | Song | ........................ | G06F 8/456 717/149 |
| 2011/0161944 A1* | 6/2011 | Cho | ........................ | G06F 8/433 717/149 |
| 2011/0314442 A1* | 12/2011 | Bondhugula | ............ | G06F 8/51 717/106 |
| 2012/0102496 A1 | 4/2012 | Ahn et al. | | |
| 2012/0144376 A1* | 6/2012 | Van Eijndhoven | ..... | G06F 8/433 717/146 |
| 2012/0254875 A1* | 10/2012 | Marathe | .................... | G06F 8/72 718/102 |

OTHER PUBLICATIONS

Kandemir, Mahmut et al., "Cache Topology Aware Computation Mapping for Multicores", 2010, pp. 74-85.*

Curtis-Maury, Matthew et al., "Online Power-Performance Adaptation of Multithreaded Programs using Hardware Event-Based Prediction", 2006, pp. 157-166.*

Raman, Easwaran et al., "Parallel-Stage Decoupled Software Pipelining", 2008, pp. 114-120.*

Kejariwal, Arun et al., "Parallelization Spectroscopy: Analysis of Thread-level Parallelism in HPC Programs", 2009, pp. 293-294.*

Andrade, Diego et al., "Using an analytical model of shared caches for selecting the optimal parallelization scheme", 2012, pp. 588-594.*

Ottoni, et al.; "Automatic Thread Extraction with Decoupled Software Pipelining", Proceedings of the 38th Annual IEEE/ACM International Symposium on Microarchitecture, Nov. 2005, 12 pages total.

Wolfe, "Scalar vs. Parallel Optimizations", CSETech, Jun. 1990, 18 pages total.

Communication dated Jul. 30, 2014, issued by the European Patent Office in counterpart European Application No. 14166856.6.

Kwon, Seongnam et al., "Serialized Multitasking Code Generation from Dataflow Specification," vol. 35, No. 9, Oct. 2008, pp. 429-440.

Stratton, John A. et al., "MCUDA: An Efficient Implementation of CUDA Kernels on Multi-cores," IMPACT Technical Report, Mar. 12, 2008, 19 pages total.

* cited by examiner

FIG. 4C

```
for i ∈ [0..N]
    V1 ← set of variables of work group i
    V2 ← set of variables of work group i-1
    for j ∈ [0..M]
        if i < N
            execute S1" using V1
        if i > 0
            execute S2" using V2
```

FIG. 5

```
initialize V₁~Vₖ as invalid
repeat
  WG ← pop a work group from work_group_queue
  Vₖ ← Vₖ₋₁; Vₖ₋₁ ← Vₖ₋₂; ··· V₂ ← V₁
  V₁ ← set of variables of WG
  break this loop if V₁~Vₖ are all invalid
  for j ∈ [0..M)
    if V₁ is valid
      execute S₁ using V₁
    if V₂ is valid
      execute S₂ using V₂
    ...
    if Vₖ is valid
      execute Sₖ using Vₖ
```

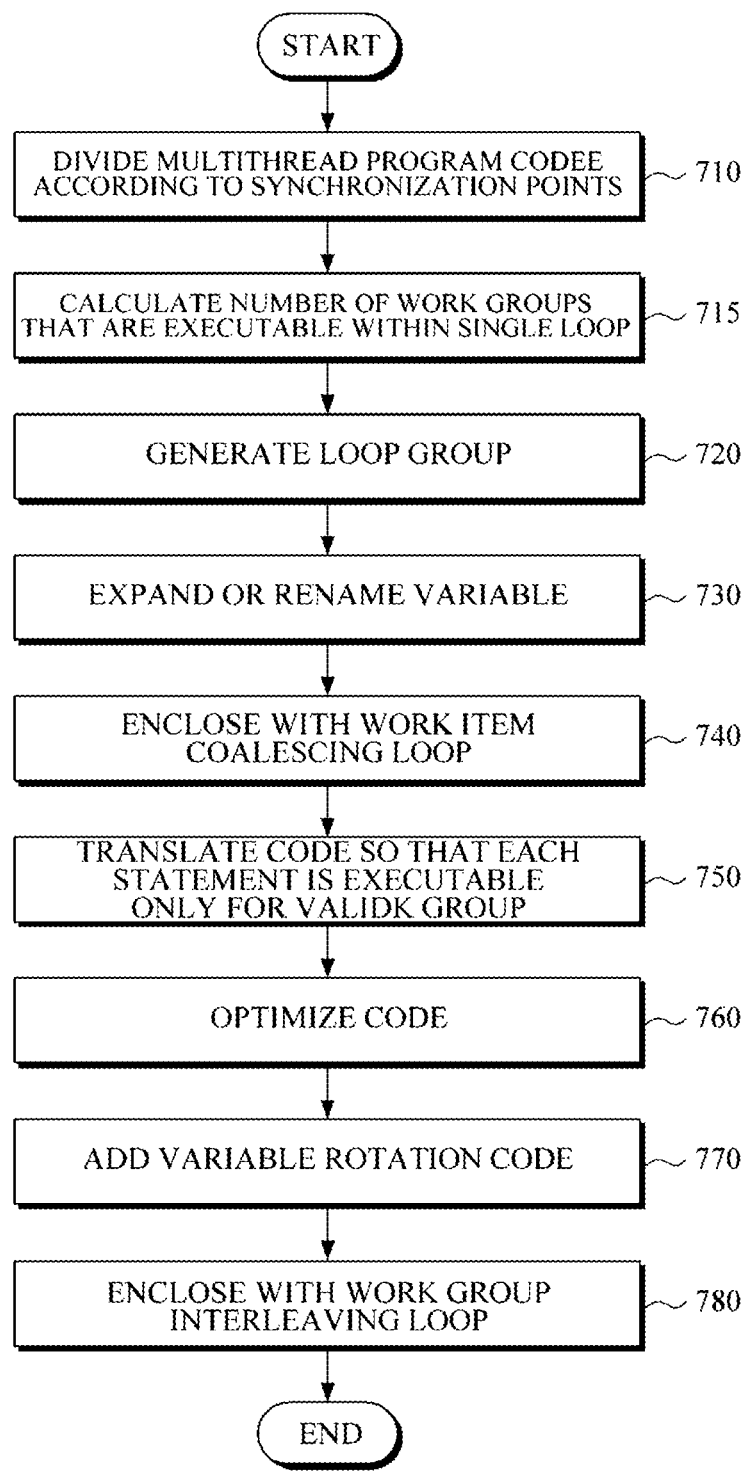

APPARATUS AND METHOD FOR TRANSLATING MULTITHREAD PROGRAM CODE

CROSS-REFERENCE TO RELATED APPLICATION

This application claims priority from Korean Patent Application No. 10-2013-0050251, filed on May 3, 2013 in the Korean Intellectual Property Office, the entire disclosure of which is incorporated herein by reference in its entirety.

BACKGROUND

1. Field

Apparatuses and methods consistent with exemplary embodiments relate to compiling a program, and more particularly, to translating a multithread program code.

2. Description of the Related Art

There has been a noticeable development in multicore or many-core technologies. In addition, a heterogeneous system for execution of a data parallel program is now drawing attention in a high performance computing field. Under these circumstances, Open Computing Language (OpenCL) is proposed to meet the demands. OpenCL is a standard for parallel programming on heterogeneous processing platforms such as central processing units (CPUs), graphics processing units (GPUs), digital signal processors (DSPs), and other processors. OpenCL allows the use of the same program source on various platforms, thereby giving software developers portability and enabling them to easily use the processing power of the platforms.

SUMMARY

Aspects of one or more exemplary embodiments provide an apparatus and method for translating a multithread program code.

According to an aspect of an exemplary embodiment, there is provided a method for translating a multithread program code, the method including: dividing a multithread program code into a plurality of statements according to a synchronization point; generating at least one loop group by combining one or more adjacent statements based on a number of instructions included in the plurality of statements; expanding or renaming variables in each of the plurality of statements so that each statement included in the generated at least one loop group is executed with respect to a work item of a different work group; and enclosing each of the generated at least one loop group respectively with a work item coalescing loop.

The multithread program code may be an OpenCL kernel code or a Compute Unified Device Architecture (CUDA) kernel code.

The synchronization point may include at least one of an entry point of the multithread program code, a barrier function, and an entry point of a control structure.

The method may further include calculating a number of work groups that are executable alternatively within a single loop group based on a capacity of a memory used by the multithread program code, wherein the generating the at least one loop group may include generating the at least one loop group by combining the one or more adjacent statement such that a number of instructions in each of the generated at least one loop group is close or equal to another and such that a number of statements of each of the generated at least one loop group does not exceed the calculated number of work groups.

The method may further include optimizing a translated code in a predetermined scheme.

The method may further include adding a variable rotation code that sets variables in each statement to indicate a memory offset at which the work group to be executed is stored.

The method may further include translating a code of a statement so that the statement is executed for only a valid work group.

The translating the code of the statement may include translating the statement using a conditional statement or predication.

The method may further include enclosing the work item coalescing loop and the variable rotation code with a work group interleaving loop so that all work groups are executed with respect to each statement.

According to an aspect of another exemplary embodiment, there is provided an apparatus for translating a multithread program code, the apparatus including: a code divider configured to divide a multithread program code into a plurality of statements according to a synchronization point; a loop group generator configured to generate at least one loop group by combining one or more adjacent statements based on a number of instructions included in the plurality of statements; a variable expander/renamer configured to expand or rename variables in each of the plurality of statements so that statements in a same loop group execute work items of a different work group serially; a work item coalescing loop adder configured to enclose each of the generated at least one loop group respectively with a work item coalescing loop.

The multithread program code may be an OpenCL kernel code or a CUDA kernel code.

The synchronization point may include at least one of an entry point of the multithread program code, a barrier function, and an entry point of a control structure.

The apparatus may further include a work group number calculator configured to calculate a number of executable work groups in a loop group based on a capacity of a memory used by the multithread program code, wherein the loop group generator is further configured to generate the at least one loop group by combining the one or more adjacent statements such that a number of instructions in each of the generated at least one loop group is close or equal to another and a number of statements of each of the generated at least one loop group does not exceed the calculated number of work groups.

The apparatus may further include a code optimizer configured to optimize a translated code in a predetermined scheme.

The apparatus may further include a variable rotation code adder configured to add a variable rotation code that sets variables in each statement to indicate a memory offset at which the work group to be executed is stored.

The apparatus may further include a code translator configured to translate a code of a statement so that the statement is executed for only a valid work group.

The code translator may be further configured to translate the code of the statement using a conditional state or predication.

The apparatus may further include a work group interleaving loop adder configured to enclose a work item coalescing loop and the variable rotation code with a work group interleaving loop so that all work groups are executed with respect to each statement.

According to an aspect of another exemplary embodiment, there is provided a method for translating a multithread program code, the method including: generating at least one loop group by combining one or more adjacent statements, among a plurality of statements divided from a multithread program code, based on a number of instructions included in the plurality of statements; modifying the plurality of statements so that each statement included in the generated at least one loop group is executed with respect to a work item of a different work group; and enclosing each of the generated at least one loop group respectively with a work item coalescing loop.

Other features and aspects may be apparent from the following detailed description, the drawings, and the claims.

BRIEF DESCRIPTION OF THE DRAWINGS

The above and/or other aspects will become apparent and more readily appreciated from the following description of exemplary embodiments, taken in conjunction with the accompanying drawings, in which:

FIG. 4C is a diagram illustrating a mnemonic code that represents the resultant code in FIG. 4A;

FIG. 5 is a diagram illustrating a mnemonic code that represents a translation result when a work group to be processed is dynamically assigned, according to an exemplary embodiment;

FIG. 7 is a flowchart illustrating a method for translating a kernel code according to an exemplary embodiment.

DETAILED DESCRIPTION OF EXEMPLARY EMBODIMENTS

Figure 1:
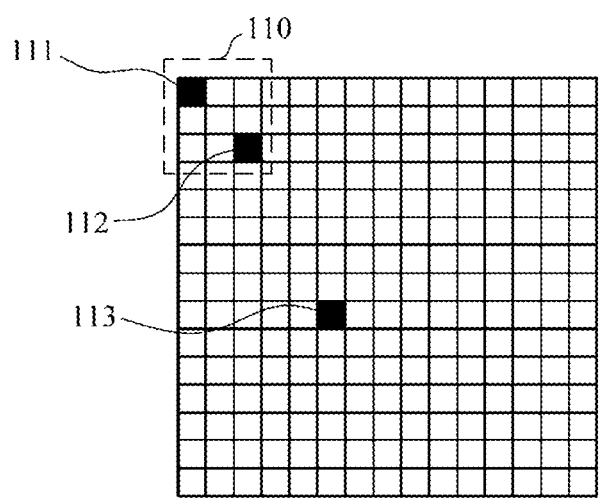
FIG. 1 is a diagram illustrating a multithread program execution model.

The following description is provided to assist the reader in gaining a comprehensive understanding of the methods, apparatuses, and/or systems described herein. Accordingly, various changes, modifications, and equivalents of the methods, apparatuses, and/or systems described herein will be understood by those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience. Hereinafter, expressions such as "at least one of," when preceding a list of elements, modify the entire list of elements and do not modify the individual elements of the list.

FIG. 1 is a diagram illustrating a multithread program execution model.

A multithread program is a program written in a fine-grained multithread programming language, such as OpenCL and CUDA, which shares a program code. For example, the multithread program may include a Fine-grained Single Program Multiple Data-threaded program. The multithread program code includes a kernel code written in OpenCL or CUDA, and descriptions hereinafter are provided with reference to a kernel code.

A kernel code may include one or more statements. A statement is an individual instruction or significant expression which composes a program, and may include an instruction sequence.

In the multithread program execution model, an execution domain is divided into multiple work items (e.g., work items 111, 112, and 113) so that a kernel code may be executed with respect to each work item (e.g., work items 111, 112, and 113). Herein, each work item (e.g., work items 111, 112, and 113) may be executed alternatively in independent threads.

When work items are to be synchronized for sharing data, the work items to be synchronized (e.g., work items 111 and 112) may be classified into one work group 110. That is, a work group is a group of work items to be synchronized, and may include one or more work items. Synchronization between work items (e.g., the work items 111 and 112) belonging to the same work group is possible, but synchronization between work items (e.g., the work items 112 and 113) belonging to a different work group may not be possible. FIG. 1 demonstrates a case in which an execution domain is divided into 15×15 work items or 5×5 work groups.

Meanwhile, a kernel code may include a barrier function (i.e., a barrier instruction). A barrier function is used to synchronize work items in the same work group. The barrier function may be called a synchronization barrier function, a synchronization function, or a barrier. If a kernel code includes a barrier function, all the work items in each work group are to be synchronized, and it is not possible to proceed to a statement beyond the barrier function until all the work items in a work group reach the barrier function.

Hereinafter, a method for translating a kernel code for parallel processing will be described in detail with the assumption that a plurality of work items to be processed operate in a single processing element.

Figure 2A:
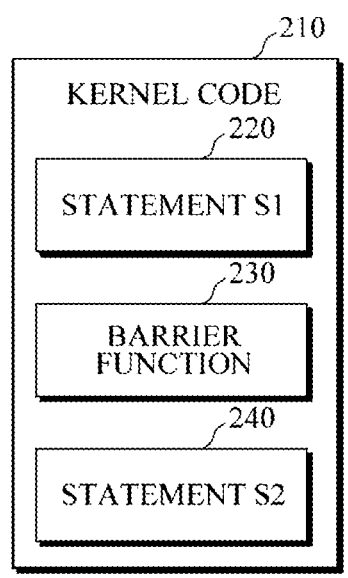
FIG. 2A is a diagram illustrating an example of a kernel code including a barrier function.
Figure 2B:
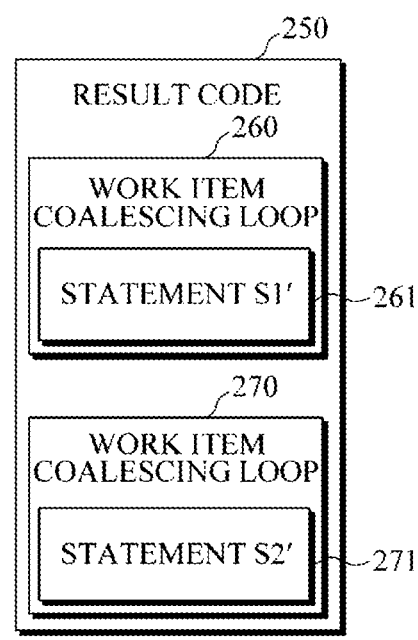
FIG. 2B is a diagram illustrating an example of a resultant code that is translated from the kernel code in FIG. 2A by serializing work items on a basis of a work group basis.
Figure 2C:
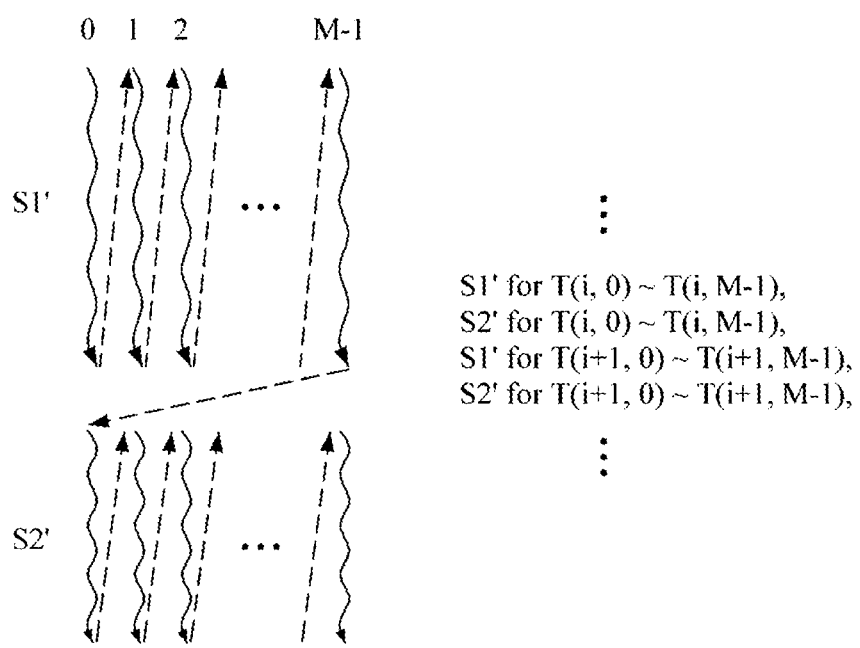
FIG. 2C is a diagram illustrating an execution sequence of the resultant code in FIG. 2B with respect to work items.

FIG. 2A is a diagram illustrating an example of a kernel code that includes a barrier function, FIG. 2B is a diagram illustrating a resultant code that is translated from the kernel code in FIG. 2A by serializing work items on a basis of a work group unit, and FIG. 2C is a diagram illustrating an execution sequence of the resultant code in FIG. 2B with respect to work items.

In the assumption that an execution domain of a multithread program execution model is divided into N number of work groups and that each work group includes M number of work items, a work item may be represented by T(i, j), where i denotes a numerical value that indicates a corresponding work group in the range of $0 \leq i < N$, and j denotes a numerical value that indicates a corresponding work item in the range of $0 \leq j < M$.

In order to execute all of the N*M number of work items in a low-level parallelism processor (or a processor with a small number of processing elements), various work items are processed in a single processing element. To this end, the work items are to be serialized in a process referred to as work item serialization, structured microthreading, or work-item coalescing.

The work item serialization is a process of translating a kernel code by enclosing the kernel code with an iterative statement so that the kernel code may be executed a number of times equal to the number of work items to be serialized. At this point, the iterative statement may be referred to as a work-item coalescing loop (WCL) or a thread loop.

As shown in FIG. 2A, if a kernel code is divided into a statement S1 220 and a statement S2 240 with reference to a barrier function 230, work item serialization may be performed on a basis of a work group unit such that the statement S1 220 and the statement S2 240, which are separate with reference to the barrier function 230, are respectively translated into a statement S1' 261 and a statement S2' 271, which lead to the same result of the statement S1 220 and the statement S2 240. Additionally, two work item coalescing loops 260 and 270, each of which iteratively executes the statement S1' 261 and the statement S2' 271, are generated to enclose the statement S1' 261 and the statement S2' 271, respectively.

A code 250, which has been translated by performing work item serialization on a basis of a work group unit, executes work items of each work group. Accordingly, the statement S1' 261 and the statement S2' 271 in FIG. 2B are executed with respect to each work item in a sequence shown in FIG. 2C. That is, the statement S1' 261 is executed with respect to all the work items (from T(i, 0) to T(i, M−1)) belonging to a work group i, and then the statement S2' 271 is executed with respect to all the work items (from T(i, 0) to T(i, M−1)) belonging to the work group i Furthermore, the statement S1' 261 and the statement S2' 271 are executed sequentially for all the work items (from T(i+1, 0) to T(i+1, M−1)) belonging to a work group i+1. As such, a translated code on which work item serialization is performed on a basis of a work group unit in the above-described sequence is provided.

That is, if a kernel code is translated by performing work item serialization on a basis of work group unit, the kernel code with a barrier function is translated into various small-sized iterative statements (that is, multiple iterative statements, each of which has less instructions). Reduction in the number of instructions in an iterative statement leads to a lower possibility of finding out an instruction that directs an instruction scheduler of a compiler or an out-of-order scheduler of a Central Processing Unit (CPU) to execute simultaneously, but also increasing overheads for iteration of an instruction with semantics (e.g., comparison of instruction variables, an increase in instruction variables, and branch), so that the instruction-level parallelism (ILP) may be degraded.

Figure 3:
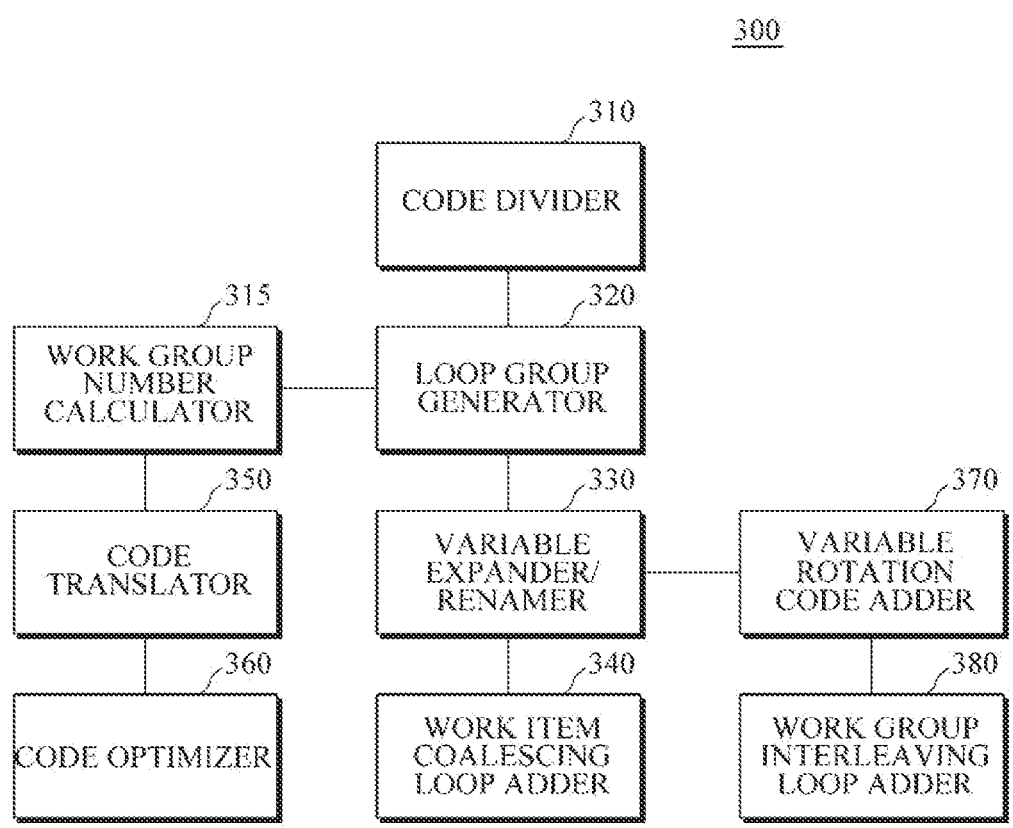
FIG. 3 is a block diagram illustrating an apparatus for translating a code according to an exemplary embodiment.

FIG. 3 is a block diagram of an apparatus 300 for translating a code according to an exemplary embodiment.

Referring to FIG. 3, the apparatus 300 for translating a code includes a code divider 310, a loop group generator 320, a variable expander/renamer 330, and a work item coalescing loop adder 340.

The code divider 310 may divide an input kernel code into one or more statements according to a synchronization point. Herein, the synchronization point may include an entry point of a kernel code, a barrier function, and an entry point of a control structure.

For example, if a kernel code does not include a barrier function, the kernel code itself may be determined as a single statement. In this case, the kernel code becomes a single statement.

In another example, if a kernel code includes a barrier function, the kernel code may be divided into two statements with reference to the barrier function, that is, one statement before the barrier function and the other statement after the barrier function.

Alternatively, in another example, if a barrier function is included in a conditional statement, the outside of the conditional statement may be divided into a statement before the conditional statement and a statement after the conditional statement. In addition, the inside of the conditional statement may be divided with reference to the barrier function into a statement before the barrier function and a statement after the barrier function.

Furthermore, in another example, if a barrier function is included in a loop statement, a code outside of the loop statement is executed once with respect to each work item, but a code inside of the loop statement is executed a number of times equal to the number of iterations of the loop statement with respect to each work item. Thus, the code outside of the loop statement and the code inside of the loop statement may be separate. In other words, with respect to the outside of the loop statement, a kernel code may be divided into a statement before the loop statement and a statement after the loop statement. In addition, with respect to the inside of the loop statement, a kernel code may be divided into a statement specifying a condition of a loop, a statement before the barrier function, and a statement after the barrier function.

The loop group generator 320 may generate a loop group that includes one or more statements, which are to be enclosed by a work item coalescing loop, based on the number of instructions in the statements divided by the code divider 310.

In an exemplary embodiment, the loop group generator 320 may generate a loop group by combining adjacent statements based on the number of instructions in each separate statement, so that the number of instructions in each loop group may become close or equal to that of each other.

For example, assuming that a kernel code is divided into five statements, which includes a statement S1 with 100 instructions, a statement S2 with 20 instructions, a statement S3 with 30 instructions, a statement S4 with 30 instructions, and a statement S5 with 110 instructions, and that three work groups can be executed alternatively within one loop. In this case, in order to make the number of instructions in each loop group close or equal to that of each other, the loop group generator 320 may generate a first loop group including the statement S1 (the number of instructions=100), a second loop group including the statements S2, S3 and S4 (the number of instructions=20+30+30=80), and a third loop group including the statement S5 (the number of instructions=110).

With respect to each of the loop groups generated by the loop group generator 320, the variable expander/renamer 330 may expand or rename variables in each statement so that statements in the same loop group execute work items of a different work group, serially.

In an exemplary embodiment, the variable expander/renamer 330 may perform scalar expansion on variables in each statement or rename the variables so that each statement in the same loop group serially executes a work item of a different work group. In this case, a variable on which scalar expansion is performed may be a private variable that is used exclusively by each work item, and a variable to be renamed may be a local variable that is shared within each work group.

A work items belonging to each work group may have variables at different locations due to scalar expansion. In addition, by renaming variables, a different data location may be set for a work group to be executed with respect to each statement.

Meanwhile, to keep semantics of a kernel code intact, a translated code may be executed in a way that all the statements are executed with respect to all the work groups or that each statement is executed with respect to a different work group when multiple statement are executed within a single loop group. Thus, adjacent statements belonging to different loop groups of a translated code are to be executed with respect to the same work group. In addition, adjacent statements belonging to the same loop group of a translated code are to be executed with respect to different work groups such that the faster a statement appears in the kernel code, the greater number a work group is given with respect to which the statement is executed. For example, assuming that the statement S1 belongs to a first loop group, the statements S2, S3, and S4 belong to a second loop group, and the statement S5 belongs to a third loop group, and that the statement S2 is executed with respect to a work group i. In this case, among the statements S2, S3, and S4 of the second loop group, the statement S2 appears first in the kernel code so that the statements S3 and S4 are executed with respect to work groups i−1 and i−2, respectively. In addition, the statements S1 and S2 are adjacent statements belonging to different loop groups, so the statements S1 and S2 are executed with respect to the same work group i, and similarly, the statements S4 and S5 are executed with respect to the same work group i−2.

In an exemplary embodiment, when expanding or renaming variables in each statement, the variable expander/renamer 330 may consider work groups of each statement.

The work item coalescing loop adder 340 may generate and add a work item coalescing loop that encloses each loop group that is generated in the loop group generator 320.

In addition, the apparatus 300 may further include a work group number calculator 315 configured to calculate the number of work groups that are executable alternatively within the same work item coalescing loop.

In an exemplary embodiment, by taking into consideration the number of statements separated by the code divider 310 and a memory space for each work group, the work group number calculator 315 may calculate the number of work groups that are executable alternatively at the same time. For example, if a disposable memory size is large enough, the work group number calculator 315 may determine the number of alternatively executable work groups to be close or equal to the number of the separate statements. Alternatively, if a disposable memory size is not large enough, the work group number calculator 315 may accordingly reduce the number of alternatively executable work groups and properly calculate the number of alternatively executable work groups by taking into consideration the disposable memory size.

In this case, in order to prevent the number of statements included in a single loop group from exceeding the number of work groups that are executable alternatively at the same time, which is calculated by the work group number calculator 315, the loop group generator 320 may consider the calculated number of work groups when generating a loop group.

In addition, the apparatus 300 may further include a code translator 350 configured to add or translate a code so that each statement is executed only for a valid work group. For example, suppose that the statement S1 executes a work group i and the statement S2 executes a work group i−1, and that a work group is in the range of 0≤i<N. In this case, with a condition of i=0, the statement S2 is to execute a work group −1, but the work group −1 does not exist. In addition, with a condition of i=N, the statement S1 is to execute a work group N, although the work group N does not exist. Thus, the statement S2 cannot be executed in the condition of i=0, and the statement S1 cannot be executed in the condition of i=N. Accordingly, the code translator 350 may add a conditional statement in order to cause each statement to be executed only for a valid work group, or may translate a code of a corresponding statement to use predication.

In addition, the apparatus 300 may further include an optimizer 350 configured to optimize a translated code.

In an exemplary embodiment, the code optimizer 350 may optimize a code using various preset loop optimization schemes or scalar optimization schemes. For example, if a code has been translated such that each statement is executed only for a valid work group, the code optimizer 350 may optimize the translated code through loop unswitching or may change a private variable from an array into an ordinary variable through scalar replacement.

Also, the apparatus 300 may further include a variable rotation code adder 370 configured to add a variable rotation code that results in variables in each statement to indicate a memory offset at which a work group to be executed is stored. That is, the variable rotation code is a code to set variables in each statement to indicate a memory offset at which a work group to be executed is stored.

In addition, the apparatus 300 may further include a work group interleaving loop adder 380 configured to generate and add a work group interleaving loop to enclose all the work item coalescing loops and variable rotation codes, so that statements may be executed with respect to all the work groups.

Figure 4A:
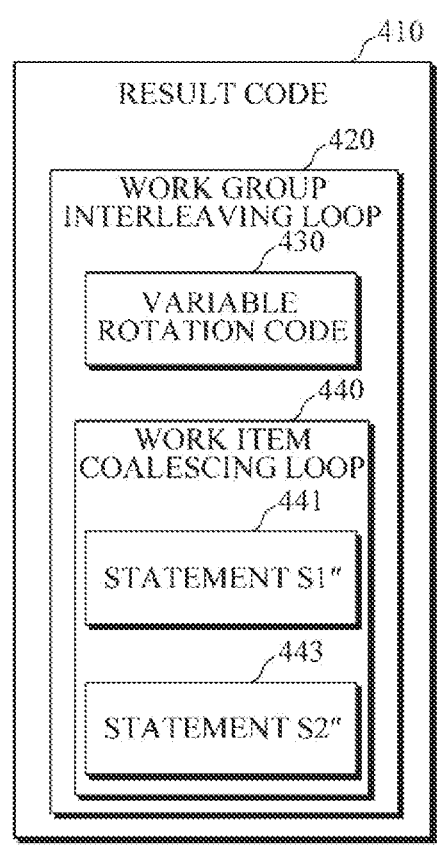
FIG. 4A is a diagram illustrating a resultant code that is translated from the kernel code in FIG. 2A according to an exemplary embodiment.
Figure 4B:
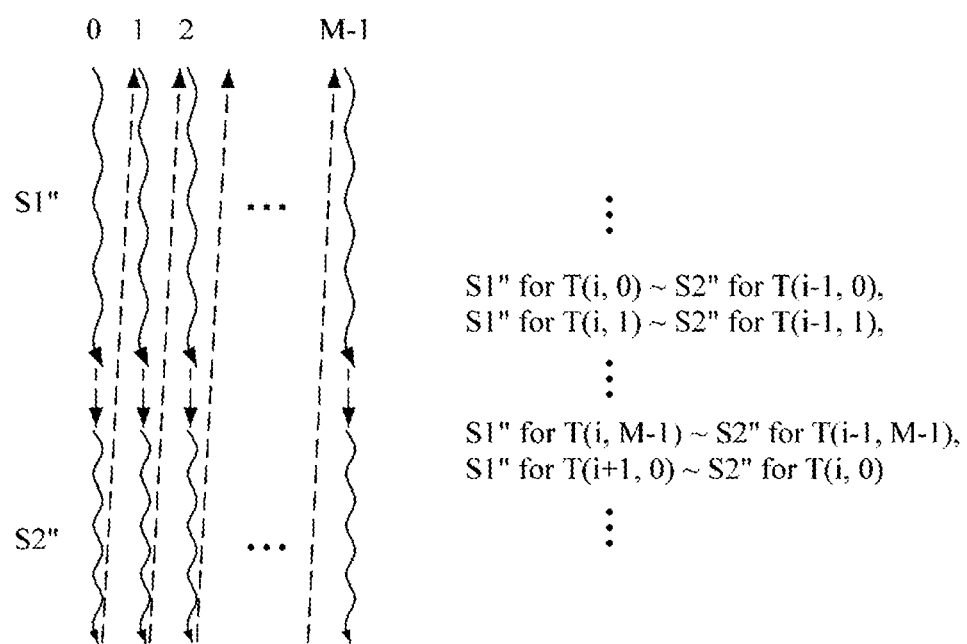
FIG. 4B is a diagram illustrating an execution sequence of the resultant code in FIG. 4A with respect to work items.

FIG. 4A is a diagram illustrating a resultant code translated from the kernel code in FIG. 2A, FIG. 4B is a diagram illustrating an execution sequence of the resultant code with respect to work items, and FIG. 4C is a diagram illustrating a mnemonic code that represents the resultant code in FIG. 4A.

Referring to FIGS. 4A to 4C, a resultant code 410 translated according to an exemplary embodiment is illustrated.

In other words, in the resultant code 410 in FIG. 4A, two work groups are executed alternatively. That is, the resultant code is executed in a sequence where the statement S1" 441 is executed with respect to a work item 0(T(i, 0)) of a work group i, then the statement S2" 443 is executed with respect to a work item 0(T(i−1, 0)) of a work group i−1 and then the statement S1"441 is executed with respect to the work item 1(T(i, 1)) of the work group i, rather than in a sequence where the statement S1" 441 is executed with respect to a work item 0(T(i, 0)) of a work group i and then the statement S1" 441 is executed with respect to a work item 1(T(i, 1)) of the work group i. In other words, a following statement executes a work item with a numerical value that is smaller by one, compared with that of a preceding statement. Such an execution sequence can be presented as a single iterative statement (that is, a work item coalescing loop), and thus, less iterative statements may be generated during serialization processing.

Meanwhile, the statement S1" 441 and the statement S2" 443 are arranged sequentially in the code, but use independent data, so that data-level parallelism (DLP) is achieved.

The variable rotation code 430 is a code that sets variables in each statement to indicate a memory offset at which a work group to be executed is stored, and the variable rotation code 430 is added by the variable rotation code adder 370.

In an exemplary embodiment, in the case where all the work groups have the same variable layout, except for a memory offset, the variable rotation code 430 may be configured to adjust an offset of a reference/pointer of a variable. For example, in the case where a code includes two variables, x and y, renaming may be performed by declaring a structure with fields of x' and y', which is similar to a structure with fields of x and y, and then inputting the variables in the fields of x and y to the fields of x and y, respectively. In this case, a variable rotation code may be a code that inputs a specific offset address to a reference/pointer of a structure that is used in remaining a variable.

Meanwhile, the work group interleaving loop 420 is a loop that is inserted in order to execute all the statements 441 and 443 with respect to all the work groups. In some cases, the statement S1" 441 or the statement S2" 443 are not to be executed at the beginning or end of an iterative statement that constitutes the work group interleaving loop 420. For example, if a work group is in the range of 0≤i<N, if a work group i is 0, a work group −1 does not exist, so that the statement S2" 443 cannot be executed. In addition, if the work group i is N and the work group N does not exist, the statement S1" 441 cannot be executed. Thus, in order for the statement S1" 441 or the statement S2" 443 to satisfy respective execution conditions, the code translator 450 translates each code of the statement S1" 441 or the statement S2" 443. In this case, just like the code shown in FIG. 4C, a conditional statement or predication may be utilized.

That is, when a conditional statement is used, the code optimizer 360 may optimize a translated code through loop unswitching, and, when predication is used, the code optimizer 360 may optimize a translated code through predicate analysis.

FIG. 5 is a diagram illustrating a mnemonic code that represents a translated code when a work group to be processed is dynamically given, according to an exemplary embodiment. FIG. 4C demonstrates an example in which work groups to be processed are given numerical values from 0 to N−1, and the same processing method may be adapted in a case where a work group to be processed is dynamically given. In FIG. 5, it is assumed that a work group (WG) (in the third row) is set as invalid in response to an empty queue, and that a set of variables (V1) (in the fifth row) is set as invalid if the work group (WG) is set as being invalid.

Figure 6:
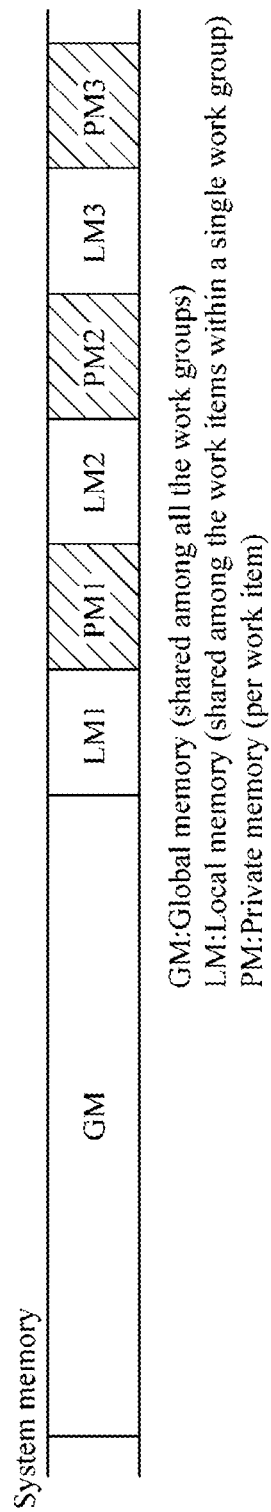
FIG. 6 is a diagram illustrating an example of layout of a memory space according to an exemplary embodiment.

FIG. 6 is a diagram illustrating a layout of a memory space according to an exemplary embodiment.

For implementation of a multithread program, a system memory address space may be divided into a global memory, a local memory, and a private memory. The global memory is a memory shared between all the work groups/work items of an entire domain to store data, the local memory is a memory shared between work items of the same work group to store data, and the private memory is a memory used exclusively by a single work item to store data.

A different set of a local memory and a private memory are assigned to each work group, and used for a lifetime of a corresponding work group. Thus, if the local memory and private memory are re-assigned to a different work group after the life time of the corresponding work group has elapsed, various work groups may use the local memory and private memory. Accordingly, as shown in the example of FIG. 6, all the work groups may be executed such that three sets of a local memory LM1, LM2, and LM3 and a private memory PM1, PM2, and PM3 are secured and sequentially assigned to corresponding work groups.

For example, work groups may be executed with a work group 0 assigned with a local memory LM1 and a private memory PM1, a work group 1 assigned with a local memory LM2 and a private memory PM2, and a work group 2 assigned with a local memory LM3 and a private memory PM3. In this case, when the work group 0 is finished, the local memory LM1 and the private memory PM1 are re-assigned to the next work group (e.g., a work group 3).

FIG. 7 is a flowchart illustrating a method for translating a kernel code according to an exemplary embodiment.

Referring to FIG. 7, the method for translating a kernel code includes dividing a kernel code into one or more statements according to a synchronization point in operation 710. The synchronization point may include an entry point of the kernel code, a barrier function, and an entry point of a control structure.

For example, if the kernel code does not include a barrier function, the entire kernel code is regarded a single statement with reference to the entry point of the kernel code.

In another example, if the kernel code includes a barrier function, the kernel code may be divided into a statement before the barrier function and a statement after the barrier function with reference to the barrier function.

Furthermore, in another example, if a barrier function is included in a conditional statement, the outside of the conditional statement may be divided into a statement before the conditional statement and a statement after the conditional statement with reference to the barrier function. In addition, the inside of the conditional statement may be divided into a statement before the barrier function and a statement after the barrier function with reference to the barrier function.

Additionally, in another example, if a barrier function is included in a loop statement, a code outside of the loop statement is executed once with respect to each work item, but a code inside of the loop statement is executed a number of times equal to the number of iterations of the loop statement with respect to each work item. Thus, the outside of the loop statement may be divided into a statement before the loop statement and a statement after the loop statement. In addition, the inside of the loop statement may be divided into a statement specifying a condition of a loop, a statement before the barrier function, and a statement after the barrier function.

A loop group, which includes one or more statements and to be enclosed by a work item coalescing loop, is generated based on the number of instructions included in each separate statement in operation 720.

In an exemplary embodiment, a loop group is generated by combining adjacent statements based on the number of instructions in each separate statement, so that the number of instructions included in each loop group may become close or equal to that of each other.

For example, assuming that a kernel code is divided into five statements, including a statement S1 with 100 instructions, a statement S2 with 20 instructions, a statement S3 with 30 instructions, a statement S4 with 30 instructions and a statement S5 with 110 instructions, and that three work groups can be executed alternatively within one loop. In this case, in order to make the number of instructions in each loop group close or equal to that of each other, three loop groups may be generated, including a first loop group including the statement S1 (the number of instructions=100), a second loop group including the statements S2, S3, and S4 (the number of instructions=20+30+30=80), and a third loop group including the statement S5 (the number of instructions=110).

Variables in each statement may be expanded using scalar expansion or the variables are renamed in operation 730.

In an exemplary embodiment, variables in each statement in a loop group may be expanded using scalar expansion or may be renamed so that each statement of the loop group serially executes work items of a different work group. In this case, a variable to be expanded may be a private variable that is used exclusively by each work item, and a variable to be renamed may be a local variable that is shared only within the same work group.

Due to scalar expansion, each work item of the same work group may have variables at different locations. Alternatively, due to renaming the variables, each statement may designate a different data location of a work group to be executed.

Meanwhile, to keep semantics of a kernel code intact, a translated code is to be executed in a way that all the statements are executed with respect to all the work groups or that each statement is executed with respect to a different work group when multiple statement are executed within a single loop group. Thus, adjacent statements belonging to different loop groups of a translated code are to be executed with respect to the same work group. In addition, adjacent statements belonging to the same loop group of a translated code are to be executed with respect to different work groups such that the faster a statement appears in the kernel code, the greater number a work group is given with respect to which the statement is executed. For example, assuming that statement S1 belongs to a first loop group, the statements S2, S3, and S4 belong to a second loop group, and the statement S5 belongs to a third loop group, and that the statement S2 is executed with respect to a work group i. In this case, among the statements S2, S3, and S4 of the second loop group, the statement S2 appears first in the kernel code so that the statements S3 and S4 are executed with respect to work groups i−1 and i−2, respectively. In addition, the statements S1 and S2 are adjacent statements belonging to different loop groups, so that the statements S1 and S2 are executed with respect to the same work group i, and similarly, the statements S4 and S5 are executed with respect to the same work group i−2.

In an exemplary embodiment, the above described work group of each statement may be considered when expanding variables in each statement using scalar expansion or renaming the variables.

Each generated loop group is enclosed by a work item coalescing loop in operation 740.

In addition, the method for translating a code may further include calculating the number of alternatively executable work groups within a single work item coalescing loop in operation 715. In an exemplary embodiment, by taking into account the number of statements separated in operation 710 and a memory size for each work group, it is possible to calculate the number of alternatively executable work group. For example, if a disposable memory size is large enough, the number of alternatively executable work groups may be determined to be equal to the number of separate statements. Alternatively, if a disposable memory size is not large enough, the number of alternatively executable work groups may be reduced properly and according to the disposable memory size.

In this case, during operation 720 of generating a loop group, the number of work groups calculated in operation 715 is taken into consideration so that the number of statements belonging to a single loop group may not exceed the calculated number of work groups.

In addition, the method for translating a code may further include an operation 750 of adding or translating a code so that each statement may be executed with respect to a valid work group. For example, it is assumed that statements S1 and S2 execute work groups i and i−1, respectively, and that each work group is in the range of $0 \leq i < N$. At this point, if a condition of i=0 is given, the statement S2 is to execute a work group −1, although the work group −1 is invalid. Thus, the statement S2 cannot be executed in a condition of i=0, and, similarly, the statement S1 cannot be executed in a condition of i=N (where the work group N is invalid). In such cases, it is possible to execute each statement only for a valid work group using a conditional statement or using predication.

Furthermore, the method for translating a code may further include an operation 760 of optimizing a code in a predetermined scheme. In an exemplary embodiment, at least one of a loop optimization and a scalar optimization may be employed. For example, if a code has been translated so that each statement may be executed only for a valid work group, it is possible to optimize the translated code through loop unswitching or to change some private variables from array into normal variables through scalar replacement.

The method for translating a code may further include an operation 770 of adding a variable rotation code that sets variables in each statement to indicate a memory offset at which a work group to be executed is stored.

Moreover, the method for translating a code may further include an operation 780 of enclosing all the work item coalescing loops with a work group interleaving loop so that a statement is able to be executed with respect to all the work groups. At this point, if a variable rotation code is added, a work group interleaving loop may enclose the variable rotation code and the work item coalescing loops all together.

By serializing OpenCL or CUDA program codes according to one or more exemplary embodiments, it is possible to execute a plurality of work groups alternatively in a device which has a relatively small number of processing elements.

In addition, as a lower number of iterative statements is generated during serialization according to one or more exemplary embodiments, overhead caused by the iterative statements may be reduced.

Furthermore, as the number of instructions included in an iterative statement increases and each part of a kernel code performs computation using different data according to one or more exemplary embodiments, there is an increased chance of finding an instruction that can be executed at the same time, leading to processing performance improvement.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like.

Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner. Also, functional programs, codes and code segments to implement those exemplary embodiments may be easily inferred by programmers who are skilled in the related art.

Those who are skilled in the related art may understand that various and specific modifications may be made without modifying the technical ideas or essential characteristics of the present inventive concept. Accordingly, exemplary embodiments disclosed above are to be considered as illustrative. The scope of the invention is defined in the appended claims and their equivalents.

What is claimed is:

1. A method for translating a multithread program code, the method comprising:
   dividing a multithread program code into a plurality of statements according to a synchronization point;
   generating at least one loop group by combining one or more adjacent statements based on a number of instructions included in the plurality of statements;
   expanding or renaming variables in the plurality of statements so that each statement included in the generated at least one loop group is executed with respect to a work item of a different work group; and
   enclosing each of the generated at least one loop group respectively with a work item coalescing loop,
   wherein the method further comprises calculating a number of executable work groups for the at least one generated loop group based on a capacity of a memory used by the multithread program code, and
   wherein the generating the at least one loop group comprises generating the at least one loop group by combining the one or more adjacent statements according to the calculated number of executable work groups such that a number of statements of each of the generated at least one loop group does not exceed the calculated number of work groups.

2. The method of claim 1, wherein the multithread program code is an Open Computing Language (OpenCL) kernel code or a Compute Unified Device Architecture (CUDA) kernel code.

3. The method of claim 1, wherein the synchronization point comprises at least one of an entry point of the multithread program code, a barrier function, and an entry point of a control structure.

4. The method of claim 1,
   wherein the generating the at least one loop group comprises generating the at least one loop group by combining the one or more adjacent statements according to the calculated number of executable work groups such that a number of instructions in each of the generated at least one loop group is close or equal to another and such that the number of statements of each of the generated at least one loop group does not exceed the calculated number of work groups.

5. The method of claim 1, further comprising:
   optimizing a translated code in a predetermined scheme.

6. The method of claim 5, wherein the optimizing comprises optimizing the translated code by employing at least one of a loop optimization and a scalar optimization.

7. The method of claim 1, further comprising:
   adding a variable rotation code to set variables in the plurality of statements to indicate a memory offset at which a work group to be executed is stored.

8. The method of claim 1, further comprising:
   translating a code of a statement, among the plurality of statements, so that the statement is executed for only a valid work group.

9. The method of claim 8, wherein the translating the code of the statement comprises translating the statement using a conditional statement or predication.

10. The method of claim 7, further comprising:
    enclosing the work item coalescing loop and the variable rotation code with a work group interleaving loop so that all work groups are executed with respect to each of the plurality of statements.

11. The method of claim 1, wherein the dividing comprises when the multithread program code comprises a barrier function, dividing the multithread program code into a statement before the barrier function and a statement after the barrier function.

12. The method of claim 1, wherein the dividing comprises when the multithread program code comprises a barrier function included in a conditional statement, dividing the multithread program code into a statement before the conditional statement and a statement after the conditional statement, and dividing an inside of the conditional statement into a statement before the barrier function and a statement after the barrier function.

13. An apparatus for translating a multithread program code, the apparatus comprising:
    a processor
    configured to divide a multithread program code into a plurality of statements according to a synchronization point;
    configured to generate at least one loop group by combining one or more adjacent statements based on a number of instructions included in the plurality of statements;
    configured to expand or rename variables in the plurality of statements so that each statement in a same loop group executes work items of a different work group serially; and
    configured to enclose each of the generated at least one loop group respectively with a work item coalescing loop,
    wherein the processor is further configured to calculate a number of executable work groups for the at least one generated loop group based on a capacity of a memory used by the multithread program code, and to generate the at least one loop group by combining the one or more adjacent statements according to the calculated number of executable work groups such that a number of statements of each of the generated at least one loop group does not exceed the calculated number of work groups.

14. The apparatus of claim 13, wherein the multithread program code is an OpenCL kernel code or a CUDA kernel code.

15. The apparatus of claim 13, wherein the synchronization point comprises at least one of an entry point of the multithread program code, a barrier function, and an entry point of a control structure.

16. The apparatus of claim 13, wherein the processor is further configured to generate the at least one loop group by combining the one or more adjacent statements according to the calculated number of executable work groups such that a number of instructions in each of the generated at least one loop groups is close or equal to another.

17. The apparatus of claim 13, wherein the processor is further configured to optimize a translated code in a predetermined scheme.

18. The apparatus of claim 13, wherein the processor is further configured to add a variable rotation code that sets variables in the plurality of statements to indicate a memory offset at which a work group to be executed is stored.

19. The apparatus of claim 13, wherein the processor is further configured to translate a code of a statement, among the plurality of statements, so that the statement is executed for only a valid work group.

20. The apparatus of claim 19, wherein the processor is further configured to translate the code of the statement using a conditional statement or predication.

21. The apparatus of claim 18, the processor is further configured to enclose the work item coalescing loop and the variable rotation code with a work group interleaving loop so that all work groups are executed with respect to each of the plurality of statements.

22. A method for translating a multithread program code, the method comprising:
    generating at least one loop group by combining one or more adjacent statements, among a plurality of statements divided from a multithread program code, based on a number of instructions included in the plurality of statements;
    modifying the plurality of statements so that each statement included in the generated at least one loop group is executed with respect to a work item of a different work group; and
    enclosing each of the generated at least one loop group respectively with a work item coalescing loop,
    wherein the method further comprises calculating a number of executable work groups for the at least one generated loop group based on a capacity of a memory used by the multithread program code, and
    wherein the generating the at least one loop group comprises generating the at least one loop group by combining the one or more adjacent statements according to the calculated number of executable work groups such that a number of statements of each of the generated at least one loop group does not exceed the calculated number of work groups.

23. The method of claim 22,
    wherein the generating the at least one loop group comprises generating the at least one loop group by combining the one or more adjacent statements according to the calculated number of executable work groups such that a number of instructions in each of the generated at least one loop group is close or equal to another and such that the number of statements of each of the generated at least one loop group does not exceed the calculated number of work groups.

24. The method of claim 22, further comprising:
    adding a variable rotation code to set variables in the plurality of statements to indicate a memory offset at which a work group to be executed is stored.

* * * * *